Dec. 12, 1961  H. C. O'BRIEN, JR  3,012,585
PIPE COATING WITH FLOWABLE INNER LAYER
Filed June 6, 1957
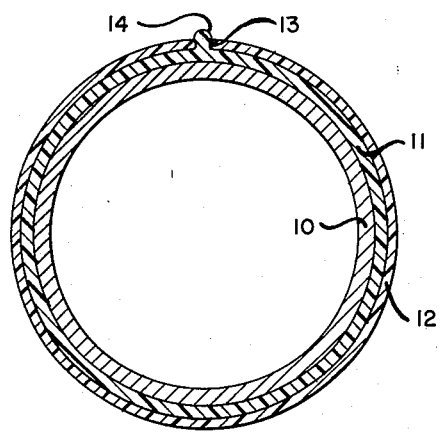
INVENTOR.
Harold C. O'Brien, Jr.
BY
his attorneys United States Patent Office 3,012,585
Patented Dec. 12, 1961

3,012,585
PIPE COATING WITH FLOWABLE
INNER LAYER
Harold C. O'Brien, Jr., Pittsburgh, Pa., assignor to Royston Laboratories, Inc., Blawnox, Pa., a corporation of Pennsylvania
Filed June 6, 1957, Ser. No. 663,938
3 Claims. (Cl. 138—141)

This invention relates to pipe coatings and particularly to a protective coating and process of coating pipes which acts to continually and immediately seal any openings or breaks in itself so as to always provide a continuous protective layer on the pipe surface.

It has long been the practice to form protective coatings over steel pipe and tubing, particularly that which is to be buried, in order to minimize corrosion. One of the common methods of coating pipe is to apply a layer of waxy material over the pipe and then to coat this waxy layer with cellulose acetate butyrate. There is no bond between the waxy undercoat and the outer butyrate coat. A single pinhole in the butyrate coat jeopardizes the entire length of pipe, which is then only protected by the waxy coating on the pipe. Another practice is to coat the pipe with a bituminous emulsion which may or may not thereafter be coated with an outer layer of paper, cloth or other covering material. Here again a pinhole or cut jeopardizes the pipe line by exposing at least the area of the injury to whatever corrosive environment may be present.

I have invented a coating and a method of applying a coating to pipe which eliminates these difficulties of prior known coatings. The coating of my invention will automatically and immediately seal any pinhole or other injury in the coating so as to continuously form a protective coating on the pipe to which it is applied.

I provide a coating of elastic resinous primer directly on the pipe, and an outer protective coating of hardenable plastic material over the elastic resinous primer so as to apply pressure on the inner resinous primer whereby the inner coating is pressurized. Preferably the outer coating is a hard, abrasion resistant electrically insulative plastic, e.g., vinyl, polyethylene, natural or synthetic rubber and compounds thereof, phenolic, epoxy, styrene, cellulose actate, etc. Preferably I use cellulose acetate butyrate for the outer coating. Preferably the coating is hot extruded over the inner coating. However, it may be cold extruded or wound onto the inner coating. The inner coating is preferably a soft, rubbery elastic resinous material flowable under pressure and capable of retaining its elasticity and flowing properties under extremes of temperature, as for example cumar-indene resin, neoprene, styrene, hydrocarbon resin compounds and plasticizers of lower molecular weight. The inner coating should be selected to be compartible with and bondable with the outer protective hardenable plastic layer. Pressure exists on this inner layer by reason of the tension of winding or shrinkage after extrusion of the outer coat. Pressure is additionally applied by the pressure of the earth on burial. Preferably the inner coating is one which will harden on exposure at holes in the outer covering.

When a fault appears in the outer protective layer of the coating of my invention, or even in both layers, the inner elastic layer flows into the fault, sealing it against the ingress of corrosive liquids. Measurements on pipe coated with the coating and method of this invention in salt solution, acids and alkali solutions have demonstarted remarkably decreased values of electrical leakage at pinholes on continuous exposure in electrolyte.

Pieces of one inch pipe were coated with a conventional wax primer and an outer cellulose acetate butyrate coating in the conventional manner. A like number of pieces of one inch pipe were coated with an inner coating of cumar-indene resin and an outer cellulose acetate butyrate coating according to the invention.

Pieces of each type of coated pipe were subjected to General Radio Bridge Resistance Measurements and the results are tabulated in Table I.

TABLE I

| | Megohms |
|---|---|
| Conventional coating | 110,000 |
| Coating of the invention | 170,000 |

Pieces of each type of coated pipe were subjected to immersion in various electrolytes after nine holes 1/16" in diameter were placed in each coating. The results of these immersion tests are tabulated hereinbelow:

TABLE II

Immersion in 50% sodium chloride solution

| | Ohms |
|---|---|
| Conventional coating | 150 |
| Coating of the invention | 1500 |

TABLE III

Immersion in 5% sodium chloride solution

| | Initial 2/4/55 | Final 2/17/56 |
|---|---|---|
| | ohms | ohms |
| Conventional coating | 80 | 100 |
| Coating of the invention | 300 | 23,000,000 |

TABLE IV

Immersion in 5% hydrochloric acid solution

| | Initial 2/4/55 | Final 2/17/56 |
|---|---|---|
| | ohms | ohms |
| Conventional coating | 20 | 60 |
| Coating of the invention | 100 | 2,000 |

TABLE V

Immersion tests in 20% sodium hydroxide solution

| | Initial 2/4/55 | Final 2/17/56 |
|---|---|---|
| | ohms | ohms |
| Conventional coating | 1,500 | 10,000,000 |
| Coating of the invention | 20,000 | 18,000,000 |

The sample of conventional coating material ruptured completely in 5% salt due to the pressure of rust beneath the coating whereas in the case of coating of this invention the extrusion of inner coating sealed the pinholes and increased the electrical resistance to 23,000,000 ohms. This is of extreme importance in considering cathodic protective current requirements for underground exposures.

The coating of this invention is illustrated in the sectional figure which accompanies this application.

In the drawing there is illustrated a pipe 10 having a coating 11 of neoprene applied directly to the outer surface thereof. An outer coating of cellulose acetate butyrate 12 is extruded over the neoprene coating so as to place the neoprene coating 11 under pressure. An opening 13 in the outer coating 12 is shown with an extruded sealing portion 14 from the inner layer 11 filling and sealing the opening 13.

While I have illustrated and described certain preferred embodiments and practices of this invention it will be understood that the invention may be otherwise embodied within the scope of the following claims.

I claim:

1. A corrosion resistant pipe comprising a pipe to be protected, a layer of electrical insulative elastic resinous primer capable of flowing at ordinary temperatures on the surface of said pipe to be protected, and an outer water-impervious layer of hardenable electrical insulative material bonded to and surrounding the layer of elastic resinous primer, said outer layer holding the elastic layer under continuous radial compression.

2. A corrosion resistant pipe comprising a pipe to be protected, a layer of electrical insulative rubbery material capable of flowing at ordinary temperatures on the surface of said pipe to be protected and an outer water impervious layer of hardenable electrical insulative material bonded to and surrounding the layer of rubbery material, said outer layer holding the rubbery material under continuous radial compression.

3. A corrosion resistant pipe as claimed in claim 1, wherein the outer water impervious layer is polyethylene.

References Cited in the file of this patent

UNITED STATES PATENTS

| | | |
|---|---|---|
| 1,763,360 | Kean | June 10, 1930 |
| 1,871,125 | McGary et al. | Aug. 9, 1932 |
| 1,914,897 | Schade | June 20, 1933 |
| 2,047,957 | Fletcher | July 21, 1936 |
| 2,161,036 | Gremmel et al. | June 6, 1939 |
| 2,215,523 | Haushalter | Sept. 24, 1940 |
| 2,403,077 | Hershberger | July 2, 1946 |
| 2,438,965 | Dasher | Apr. 6, 1948 |
| 2,811,190 | Iknayan et al. | Oct. 29, 1957 |